Patented Sept. 8, 1931

1,822,506

UNITED STATES PATENT OFFICE

WILHELM SANDER, OF ESSEN-RUHR, GERMANY, ASSIGNOR TO FIRM TH. GOLDSCHMIDT A.-G., OF ESSEN-RUHR, GERMANY

METHOD OF ACCELERATING THE REACTION IN ALUMINOTHERMIC PROCESSES ESPECIALLY IN THEIR APPLICATION TO WELDING

No Drawing. Application filed December 23, 1930, Serial No. 504,276, and in Germany November 16, 1929.

This invention relates to a method of accelerating the reaction in aluminothermic processes especially in their application to welding.

In the known aluminothermic processes, aluminium is employed in order to separate metals from metallic oxides. Other substances, such as silicon and magnesium, have also been employed for similar purposes, especially in cases where it is difficult or even impossible to separate the metal from the oxides when using aluminium. It is also known to bring very refractory metallic oxides into reaction by the use of aluminium alloys such as aluminium-magnesium.

In the known aluminothermic welding process in which iron oxides are brought into reaction with aluminium, and the resulting heat from the aluminothermic reaction raises the material, which is to be welded, to the requisite high temperature, the employment of metals, such as magnesium, possessing a greater affinity for oxygen than is the case with aluminium, is not, in itself essential, inasmuch as iron oxides are very easily reduced by aluminium, with the liberation of very considerable amounts of heat. However, in order to utilize the liberated heat as fully as possible for the welding process, the reaction must proceed quickly, since, otherwise, if too protracted, an undue amount of heat is lost by radiation and conduction. Rapidity of reaction is particularly desirable when, for reasons of economy, the amount of the aluminothermic composition is to be kept as small as possible. The only way in which the desired stimulus or activation can be imparted to the reaction is by adding to the aluminium small quantities (a few per cent by weight) of such elements as possess a greater affinity for oxygen than is the case with aluminium, such as calcium, sodium, magnesium, and the like. The quantity of metal used is in addition to the aluminum commonly employed in prior compositions and does not take the place of this ingredient as in the calcium-aluminum and other mixed thermits previously described in the art. A few per cent of calcium, sodium, magnesium or equivalent metal is added to the ordinary, simple aluminum thermit used in the art.

The reaction may also be activated by employing a small excess of aluminum in the aluminothermic mixture which is to take part in the reaction, but this is inapplicable in many cases of rail welding, such for example as in the fusing, or intercasting process, because the resulting aluminothermic iron absorbs considerable quantities of aluminium and thus becomes brittle.

It has now unexpectedly transpired that, possibly owing to the increased reaction temperature and velocity, when aluminium alloys containing the aforesaid metals are employed, an almost quantitative reaction occurs between the oxides and the reducing alloy, and consequently—as also owing to the circumstance that magnesium, calcium and similar metals are taken up to only a very slight extent by iron as alloying components—only traces of aluminium, or the other added metals, pass into the aluminothermic iron. The result is a substantial improvement in the mechanico-technical properties of the aluminothermic iron, especially as regards notched-bar tenacity and resistance to impact.

What I claim is:

1. The process of improving the properties of ordinary, simple aluminum thermit which consists in admixing with such thermit a few per cent of calcium, sodium, magnesium or equivalent metal.

2. The process of improving the properties of ordinary, simple aluminum thermit which consists in admixing with such thermit a few per cent of metallic calcium.

In testimony whereof I affix my signature.

WILHELM SANDER.